Patented Dec. 13, 1949

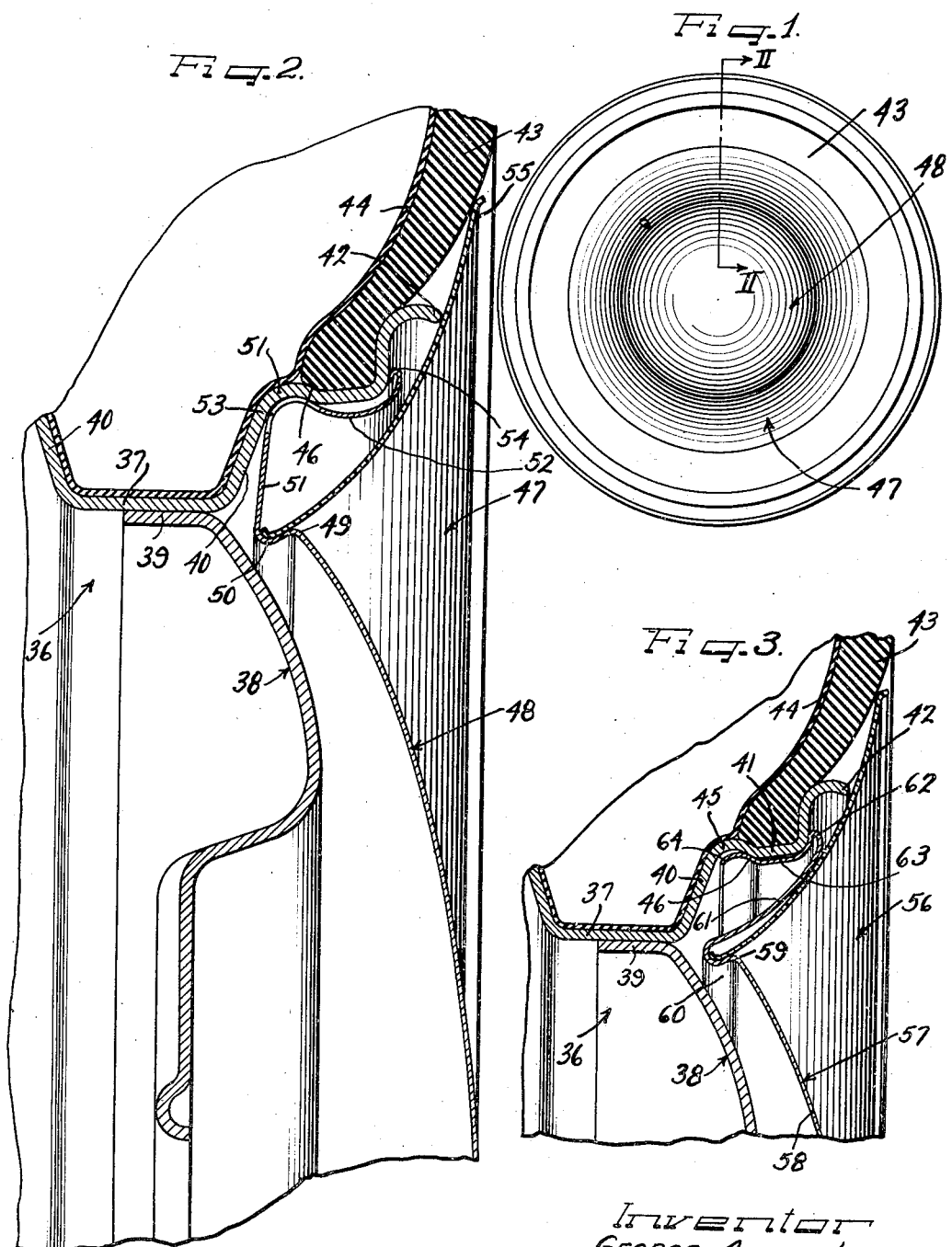

2,490,822

UNITED STATES PATENT OFFICE 2,490,822

VEHICLE WHEEL COVER

George Albert Lyon, Allenhurst, N. J.

Application July 21, 1945, Serial No. 606,392

11 Claims. (Cl. 301—37)

This invention relates to an improved wheel structure and is directed more particularly to an improved cover assembly therefor.

The subject-matter of the present application has been divided from my copending application Serial No. 513,031 filed December 6, 1943, now matured into Pat. No. 2,421,384 issued June 3, 1947.

It is an important object of the present invention to provide for disposition over the outer side of a wheel structure a cover assembly including an outer annular part formed from sheet synthetic plastic material or the like, having characteristics enabling it to be resiliently, locally, temporarily flexed and yet enabling it to be self-sustaining as to form and to immediately snap back into initial configuration when distorting pressures are relieved therefrom and a central circular hub cap simulating cover portion formed from more rigid material such as thin sheet steel or the like, this central portion being provided with means for detachably engaging the wheel structure and with further means for retainingly engaging the outer plastic cover member so that the cover assembly may be removably maintained upon the wheel structure as a unitary assembly.

It is still another object of the invention to provide for disposition over the outer side of a wheel structure, a cover assembly including an outer annular sheet synthetic plastic cover member and a central circular hub cap simulating member, the latter being formed to retainingly receive and rigidify and reinforce the outer cover member and having means arranged for detachable engagement with the wheel structure.

It is a further object of the invention to provide for disposition over a wheel structure, a cover assembly including an outer annular resiliently, temporarily, locally flexible portion formed from sheet synthetic plastic material or the like, said annular portion having a cross-sectional configuration of such shape and expense that it extends entirely over the tire rim of a wheel structure and radially outwardly beyond the same into adjacency with the side wall of a tire therein and radially inwardly to a point beyond the junction of the tire rim and a central load bearing portion thereof and having a cross-sectional shape so as to generally simulate the shape of the side wall of a tire in the tire rim to give the appearance of being a continuation thereof and to give the appearance of being a white side wall on a massive tire, when colored white, the cover assembly also including a central circular hub cap simulating member having means thereon for detachably engaging with a portion of the wheel and also having an intermediate circular part cross-sectionally configurated to provide a radially outwardly extending ribbed part behind which the radially inner margin of the annular cover may extend to afford a unitary, multi-part cover assembly, the junction between the cover parts affording lateral movement of the radially outer portions of the annular cover members to accommodate expansion of the side wall of the tire under load bearing conditions without the imposition of undue, localized stresses and strains of any part of the annular cover member when so flexed.

It is another object of this invention to provide reinforcing retaining means for a plastic cover which will not only serve the purpose of holding the cover on the wheel but which will in addition serve as a backing for the cover thereby reinforcing and strengthening the cover.

In accordance with the general features of this invention, there is provided in a cover structure for a wheel including multi-flanged rim and body parts, a central metal wheel cover having an outer marginal portion turned back upon itself for a snap-on engagement with a flange of the rim part and provided with a radially inward shoulder on which is detachably retained a plastic cover annulus extending axially and radially outwardly over the flanges of the rim part and concealing the retaining means.

Other objects and advantages of the invention will become apparent from the following description and accompanying drawings in which:

Figure 1 is a side view of a wheel showing my novel cover assembly applied thereto;

Figure 2 is an enlarged fragmentary cross-sectional view taken on the line II—II thereof, looking in the direction indicated by the arrows;

Figure 3 is a fragmentary sectional view illustrating a modification of my invention.

At the outset, it should be noted in both forms of the invention to be described hereinafter, the wheel for carrying the pneumatic tire and tube is more or less a conventional type of automobile wheel. Such wheel, as is now well known, includes a multi-flanged drop center tire rim part and a central load bearing or body part both of which parts will be designated hereinafter.

In the constructions shown in Figures 2 and 3, the wheel assemblies are identical and like parts will be similarly identified.

Referring particularly to Figure 2 the wheel assembly includes a tire rim 36 having a base flange 37 and a central load bearing portion 38 having a generally axially inwardly extending peripheral skirt or flange 39 which may be secured to the base flange 37 as by riveting or welding or the like.

The tire rim 36 is further provided with opposite side wall flanges 40, opposite intermediate flanges 41 and opposite edge portions 42 between which may be disposed a suitable pneumatic tire 43 having an inner tube 44.

In this tire rim construction there is provided at the junction of the respective side wall flanges 40 and intermediate flanges 41 a circular, radially inwardly facing curvate portion 45 which affords a radially outwardly extending groove having at its axially outer side a radially inwardly extending shoulder 46. The curvate portion 45 serves the dual purpose of securely anchoring the beads of the tire 43 in their proper position against the radially outer surfaces of the respective flanges of the tire rim and also serves to aid in the detachable retention of the cover assembly upon the wheel structure as will be explained more clearly presently.

In this construction the cover assembly is completed by the provision of an inner circular hub cap simulating cover member 48 formed preferably from relatively rigid material such as sheet metal or the like. The cover member 48 is provided at a cross-sectionally intermediate part thereof with a circularly, generally radially outwardly extending rib 49 that defines the axially outer side of a radially outwardly opening grooved portion 50 from which extends a generally radially outwardly disposed flange 51 connected with a generally axially outwardly extending portion 52 by means of an intermediate cross-sectionally curvate portion 53 preferably comprising a plurality of separate, circularly disposed resilient members. Each of these members 53 has one end connecting with the flange 51 and the other end connecting integrally with the generally axially extending portion 52. As will be seen from Figure 2 the portion 52 preferably terminates in a beaded, generally radially outwardly extending edge 54, the purpose of which will be described presently.

In the cover assembly shown in Figure 2 the cover member 47 is first elastically sprung at the radially inner margin thereof into the grooved portion 50 of the cover member 48 whereupon there is provided a unitary assembly comprising a plurality of cover parts. Thereafter, the unitary assembly may be aligned concentrically with the wheel structure and the cover member 48 pressed axially inwardly so that the resilient elements 53 are sprung radially inwardly until the axially outer portions thereof pass the shoulder 46 in the flange 41 of the tire rim. In order that this axial inward movement may be delimited it will be seen that the beaded edge 54 of the portion 52 of the cover member 48 is arranged so that as the members 53 reach their ultimate, attaching position the bead 54 abuts the adjacent portion of the outer surface of the edge portion 42 of the tire rim 36.

In removing the cover assembly of Figure 2 from the wheel structure it will be seen that the operator need merely flex a portion of the outer margin 55 of the cover member 47 axially outwardly and insert the point of a pry-off tool behind the adjacent portion of the bead 54, whereupon if the outer part of the tool is raised with the edge of the edge portion 42 as the fulcrum the point of the tool will draw the bead 54 outwardly and thus withdraw the elements 53 from the respective groove in the tire rim 10. Alternatively, the cover may be removed from the wheel by inserting the point of the pry-off tool behind the rib 49.

In the construction of Figure 3 the cover assembly includes a radially outer cover portion 56 having the attributes of the cover portion 47 of the construction shown in Figure 2. There is also provided in this construction a central hub cap simulating cover portion 57 having a central crowned portion 58 bordered by a generally radially outwardly extending bead 59 which in turn defines the axially outer part of a generally axially outwardly opening and inwardly extending grooved portion 60. This grooved portion 60 is bordered on one side by the radially-axially inner extremity of a generally radially outwardly, axially outwardly, obliquely disposed flange 61 which serves to back up the more flexible cover member 56 in a manner to be described presently.

The flange 61 of the cover member 57 terminates in an intermediate portion formed to provide a generally radially outwardly extending bead 62 which is arranged to abuttingly engage the outer surface of the radially inner part of the edge portion 42 of the tire rim 36, there being provided on the cover member 57 a marginal part comprising a generally axially inwardly extending flange 63 terminating in a radially outwardly curved, circular flange portion 64.

In utilizing the cover assembly shown in Figure 3, the cover member 56 is first secured at its radially inner edge to the cover member 57 in the manner described in conjunction with the construction of Figure 2. Thereafter the entire assembly is concentrically aligned with the wheel to which it is to be attached and urged axially inwardly until the radially outwardly extending rib 62 abuts the adjacent part of the surface of the edge portion of the tire rim. At this time the curved portion 64 of the cover member 57, which curved portion may be split radially at circumferentially spaced points if desired, will come into nested relationship with the groove formed between the respective side wall flange 40 and the respective intermediate flange 41 of the tire rim. When the parts are in this position it will be seen that the cover is securely yet detachably maintained upon the wheel structure and that the radially inner part of the cover member 56 is backed up or reinforced against crushing forces by the flange 61 of cover member 57.

In order to remove the cover assembly of Figure 3 from the wheel structure a pry-off tool may be inserted behind the cover member 56 as described in conjunction with the construction of Figure 2, whereupon the bead or rib 62 may be pried axially outwardly of the wheel or if desired the point of the pry-off tool may be inserted behind the rib or bead 59.

From the foregoing it will be seen that in each of the embodiments disclosed herein there is provided an outer annular cover member formed from sheet synthetic plastic material or the like and extending radially outwardly beyond the edge portion of a tire rim to simulate the configuration of the side wall of the tire and to give an appearance of being a continuation thereof and the white side wall of a tire when colored white. There is also provided in each of the embodiments a central circular hub cap simulating cover portion preferably formed from a more rigid material such as sheet metal or the like, each central cover portion having a generally axially extending retaining part for retainingly engaging a portion of the wheel structure and for aligning the cover assembly therewith, each having an abutment portion arranged to abuttingly engage an adjacent portion of the axially outer surface of the wheel structure to delimit the axially inward movement of the cover assembly during an attaching operation and each having an intermediate, circular, reinforcing rib for receiving the radially inner part of the outer cover member.

I claim as my invention:

1. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part formed from sheet synthetic plastic material and having a cross-sectional configuration whereby it substantially simulates the side wall of a tire in said tire rim to give the appearance of being a continuation thereof and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially outwardly extending flange terminating in a generally axially outwardly extending flange, the junction of said flanges comprising a plurality of radially outwardly humped portions arranged to fit into said radially inwardly extending groove of said tire rim to provide for detachable engagement of the cover assembly under the wheel structure.

2. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part formed from sheet synthetic plastic material and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially outwardly extending flange terminating in a generally axially outwardly extending flange, the junction of said flanges comprising a plurality of radially outwardly humped portions arranged to fit into said radially inwardly extending groove of said tire rim to provide for detachable engagement of the cover assembly onto the wheel structure, said axially outwardly extending flange terminating in a radially outwardly extending edge arranged to abuttingly engage a generally radially extending portion of the tire rim to delimit axial inward movement of the cover assembly on the wheel structure during a cover attachment operation.

3. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part formed from sheet synthetic plastic material and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially extending flange terminating in a generally axially extending flange, the junction of said flanges comprising a plurality of radially outwardly humped portions arranged to fit into said radially inwardly extending groove of said tire rim to provide for detachable engagement of the cover assembly onto the wheel structure.

4. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part formed from sheet synthetic plastic material and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially extending flange terminating in a plurality of radially outwardly humped portions arranged to fit into said radially inwardly extending groove of said tire rim to provide for detachable engagement of the cover assembly onto the wheel structure.

5. In a wheel structure including a flanged tire rim and a central load bearing portion secured thereto, said tire rim being provided with a radially inwardly opening groove at substantially the junction of certain of said flanges thereof, a multi-part, unitary cover assembly including a radially outer annular portion formed from sheet synthetic plastic material and a central circular hub cap simulating portion having a central crowned part defined on its radially outer edge by a generally radially extending annular hump behind which the radially inner margin of the outer cover member may be retainingly disposed, said hub cap simulating cover portion also including a generally axially outwardly, radially outwardly, obliquely disposed flange arranged to extend behind the radially inner portion of said outer cover member and terminating in a generally axially extending flange having the terminal portion configurated to resiliently engage in said groove of the tire rim to maintain the cover assembly upon the wheel structure in detachable relationship thereto.

6. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part formed from sheet synthetic plastic material and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially outwardly extending flange terminating in a generally axially outwardly extending flange, the junction of said flanges comprising a plurality of radially outwardly humped portions arranged to fit into said radially inwardly extending groove of said tire rim to provide for detachable engagement of the cover assembly under the wheel structure.

7. In a wheel structure including a flanged tire rim and a central load bearing portion secured thereto, said tire rim being provided with a radially inwardly opening groove at substantially the junction of certain of said flanges thereof, a multi-part, unitary cover assembly including a radially outer annular portion formed from sheet synthetic plastic material and a central circular hub cap simulating portion having a central crowned part defined on its radially outer edge by a generally radially extending annular hump behind which the radially inner margin of the outer cover member may be retainingly disposed, said hub cap simulating cover portion also including a generally obliquely disposed flange arranged to extend behind the radially inner portion of said outer cover member and terminating in a generally radially extending rib arranged to abuttingly engage a portion of the tire rim to delimit axial inward movement of the cover assembly on the wheel structure during an attachment operation, said rib terminating in a generally axially extending flange provided with a terminal configuration whereby it resiliently, detachably engages in the groove of the tire rim to maintain the cover assembly on the wheel structure.

8. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part having a cross-sectional configuration whereby it substantially simulates the side wall of a tire in said tire rim to give the appearance of being a continuation thereof and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially outwardly extending flange terminating in a generally axially extending portion, the junction of said flange and flange portion comprising tire rim engaging means and the extremity of said flange portion constituting a further tire rim engaging means, one of said tire rim engaging means being detachably engageable in said tire rim groove and the other of said means engaging the tire rim at a point spaced from said groove and functioning to delimit axially inward movement of the cover assembly.

9. In a wheel structure including a flanged tire rim and a central load bearing portion secured thereto, said tire rim being provided with a radially inwardly opening groove at substantially the junction of certain of said flanges thereof, a multi-part, unitary cover assembly for disposition over the outer side of the wheel structure including a radially outer part having a cross-sectional configuration whereby it substantially simulates the side wall of a tire in said tire rim to give the appearance of being a continuation thereof and a central circular hub cap simulating cover part including a central crowned portion defined at its radially outer part by a circular, generally radially outwardly opening groove arranged to retainingly receive the radially inner margin of said outer cover member, said central hub cap simulating cover part including a generally radially outwardly extending flange terminating in a generally axially extending portion, the junction of said flange and flange portion comprising a generally radially outwardly extending tire rim engaging structure and the extremity of said flange portion also comprising a generally radially outwardly extending tire rim engaging structure, one of said tire rim engaging structures being engageable in said tire rim groove and the other of said tire rim engaging structures engaging the tire rim in spaced relation thereto and serving to delimit axially inward movement of the cover assembly on the wheel.

10. In a wheel cover for a wheel including a flanged tire rim including a generally axially extending flange formed with a radially inwardly opening groove, a circular plastic cover member and a circular member constructed and arranged to retain the plastic member on the wheel and having a portion thereof adapted to enter into snap-on and off detachable engagement within the tire rim groove and another portion thereof disposed axially outwardly from the groove-engaging portion and projecting radially outwardly to provide a pry-off projection for engagement by a pry off tool to dislodge the cover by effecting disengagement of said groove-engaging portion from the rim groove, said circular retaining member having an annular groove therein and said plastic cover member having a circular edge assembled with said retaining member within said groove whereby to afford a self-contained unit.

11. In a wheel cover for a wheel including a flanged tire rim including a generally axially extending flange formed with a radially inwardly opening groove, a circular plastic cover member and a circular member constructed and arranged to retain the plastic member on the wheel and having a portion thereof adapted to enter into snap-on and off detachable engagement within the tire rim groove and another portion thereof disposed axially outwardly from the groove-engaging portion and projecting radially outwardly to provide a pry-off projection for engagement by a pry-off tool to dislodge the cover by effecting disengagement of said groove-engaging portion from the rim groove, said circular retaining member having an annular groove therein and said plastic cover member having a circular edge assembled with said retaining member within said groove whereby to afford a self-contained unit, said groove and the retaining member being defined by a generally radially outwardly extending rib engageable by a pry-off tool upon flexure of the plastic cover member for access thereto by said tool.

GEORGE ALBERT LYON.

REFERENCES CITED

The following references are of record in the file of this patent:

UNITED STATES PATENTS

| Number | Name | Date |
|---|---|---|
| 2,308,617 | Lyon | Jan. 19, 1943 |
| 2,309,519 | Lyon | Jan. 26, 1943 |
| 2,368,243 | Lyon | Jan. 30, 1945 |
| 2,368,246 | Lyon | Jan. 30, 1945 |